March 10, 1959  J. M. BARR  2,877,004
FUEL INDUCTION SYSTEM
Filed Sept. 10, 1956  3 Sheets-Sheet 3
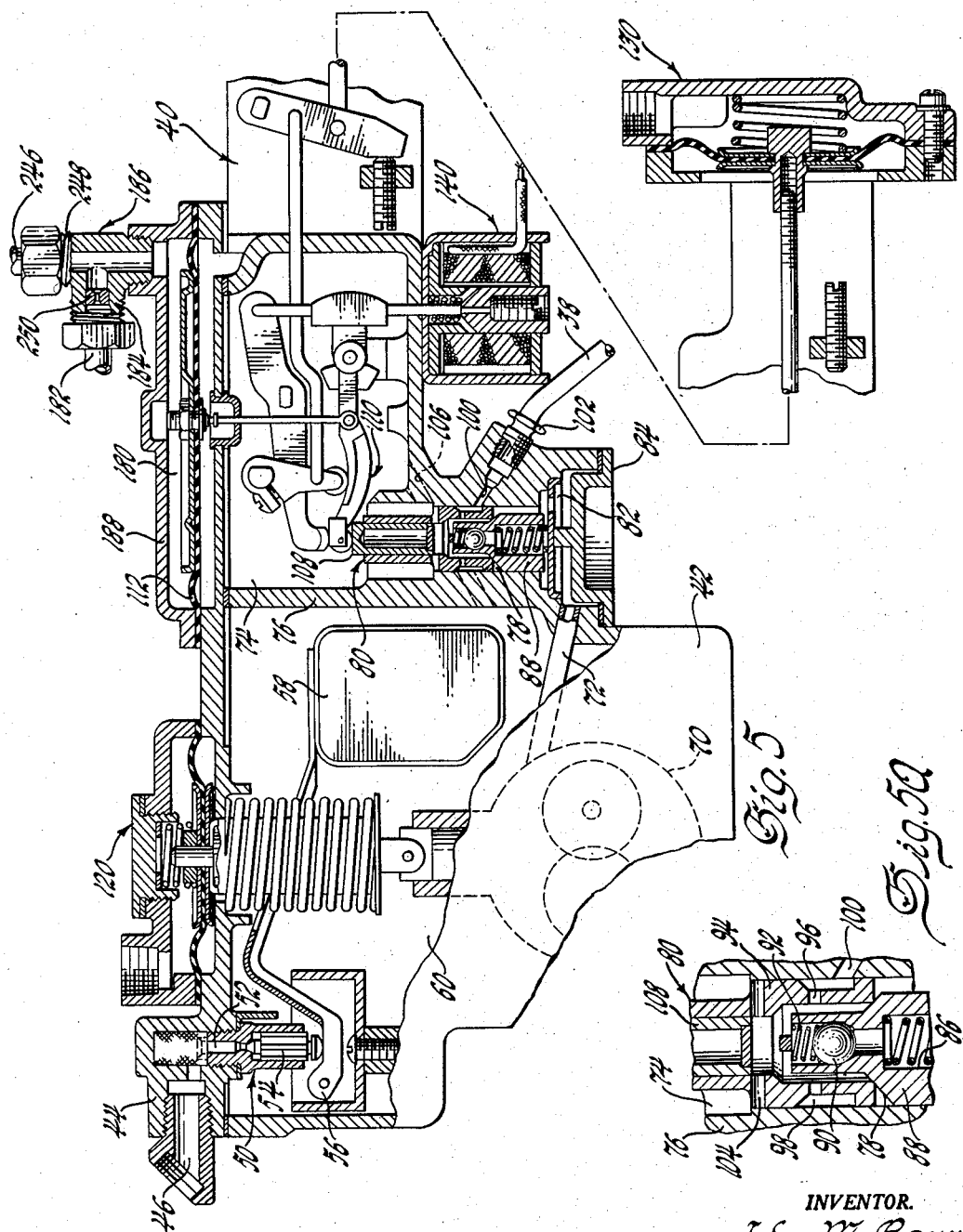
INVENTOR.
John M. Barr
BY R. F. Barnard
ATTORNEY

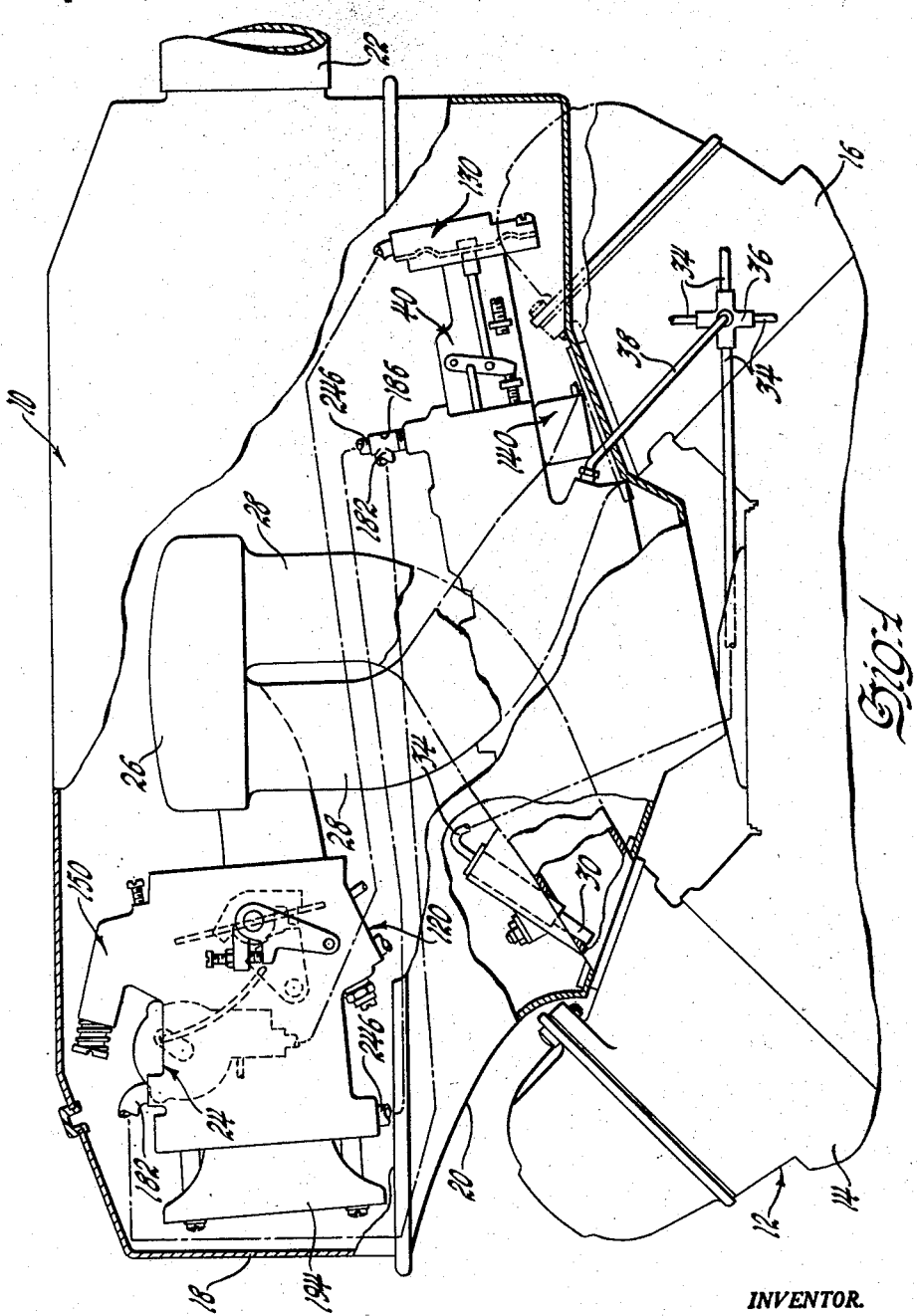

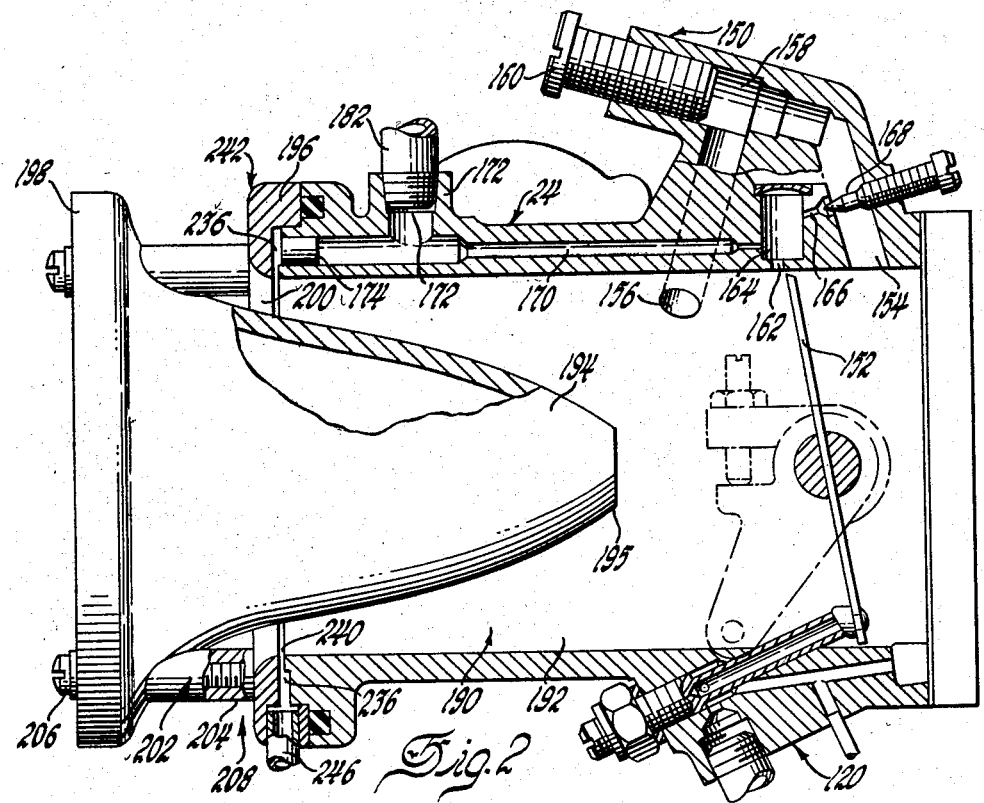
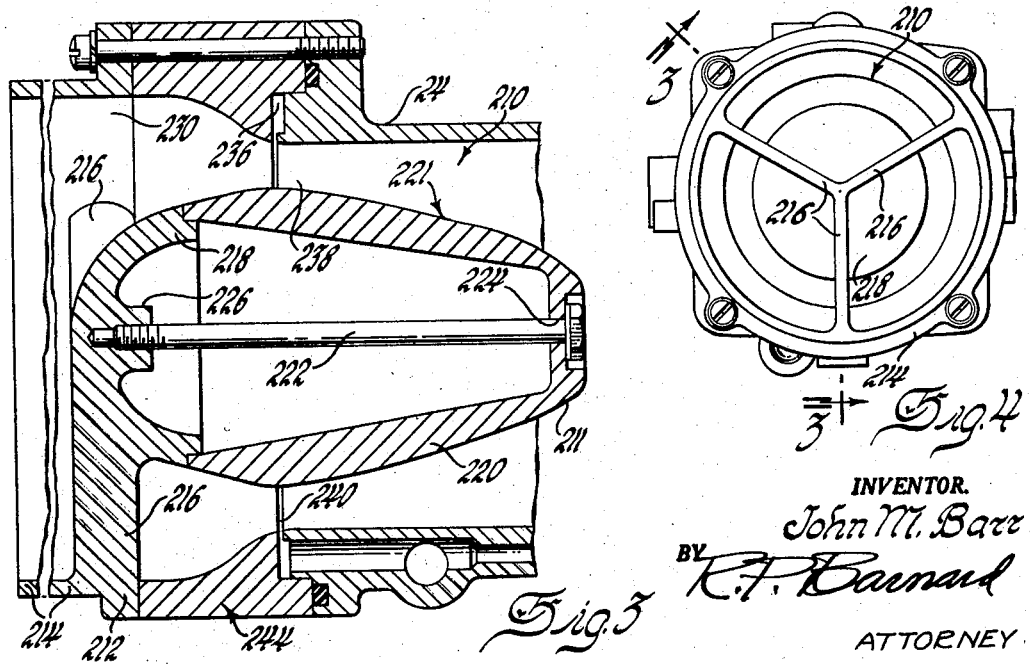

United States Patent Office 2,877,004
Patented Mar. 10, 1959

2,877,004
FUEL INDUCTION SYSTEM

John M. Barr, Rochester, N. Y., assignor to General Motors Corporation, Detroit, Mich., a corporation of Delaware Application September 10, 1956, Serial No. 609,021

2 Claims. (Cl. 261—64)

The present invention relates generally to a fuel induction system for supplying fuel to an engine in accordance with the mass of air flowing through said system.

More especially the present invention relates to an improved device for sensing and measuring the quantity of air flowing through the induction system whereby the quantity of fuel supplied to the system corresponds accurately to said air flow.

In conventional carbureting systems there is no necessity for precisely measuring the quantity of fuel in accordance with the mass of air flow. These components vary in the same general proportion, that is, as air flow increases so does the quantity of fuel, but where they do not correspond closely enough other devices are provided to ameliorate any fuel-air ratio disparity. For instance, in a conventional carburetor an accelerator pump is utilized to supplement the fuel supplied at a time when a rich mixture is required since the carburetor is otherwise incapable of providing a suitable fuel-air ratio. The accelerator pump and other fuel-air ratio corrective devices are provided in the main to compensate for the basic inefficiency of traditional carburetor venturis in sensing or reacting to air flow variations. This venturi inefficiency as a flow measuring device is directly traceable to the continuing foreshortening of venturis in order to reduce the vertical displacement of the carburetor in an effort to lower vehicle profiles. As suggested, it is possible in conventional carbureting systems to variously compensate for venturi inefficiency.

In a mass air flow type fuel induction system, however, it is necessary to provide an air flow sensing device which will accurately reflect fuel requirements under all running conditions. It is the solution of the air flow sensing problem to which the subject invention is dedicated.

It is an object of the present invention to provide a new and improved type of air flow sensing device which is capable of more accurately reflecting engine fuel requirements than has heretofore been possible.

It is also an object of the present invention to utilize a unique type air flow sensing device in the form of an annular venturi which functions in a highly efficient manner. By the use of the present annular venturi it is possible to achieve the flow efficiency of a many times longer traditional circular area type venturi, the latter which is not feasible in most vehicular environments due to engine space limitations.

Not only is the combination of the present annular venturi in the subject type of fuel induction system deemed to be novel but the venturi, per se, is uniquely structurally related to the other of the components of the system as will be better appreciated from the detailed description which ensues.

In the drawings:

Figure 1 shows a fuel induction system embodying the present invention;

Figure 2 shows an enlarged sectional view of the first species of the invention as also shown in Figure 1;

Figure 3 represents a second specie of the present invention taken on line 3—3 of Figure 4;

Figure 4 is a plan view of Figure 3;

Figure 5 shows the fuel supplying and metering mechanism; and

Figure 5a is an enlarged detail section as shown in Figure 5.

The present fuel induction system, except as will hereinafter be specifically described, is the same as that shown and described in copending application Serial No. 608,853 Dolza, filed September 10, 1956, now Patent No. 2,843,098. Accordingly the system will be described in detail only in relation to the mechanism which specifically constitutes the subject matter of the present invention, or such other mechanism as is necessary to an understanding of said invention.

Referring to Figure 1, the subject type fuel induction system indicated generally at 10 is shown mounted on a V-type engine 12. The fuel induction mechanism is disposed above and substantially intermediate the cylinder banks 14 and 16. It is, of course, to be understood that the invention is in no way limited by the cylinder configuration and is equally adapted to in-line or other type engines.

In general the fuel induction system is housed in a shroud consisting of an upper casing 18 and a lower casing 20. Disposed within the shroud is an air inlet opening 22 which preferably has an air cleaner, not shown, associated therewith. Air in the shroud casing 18 is drawn into the air horn casing indicated generally at 24. Air from the air horn 24 passes into a plenum chamber 26 from whence the air is delivered through manifold passages 28 to the respective engine cylinders as described in copending application Serial No. 608,853 Dolza, filed September 10, 1956.

Fuel nozzles 30 are mounted in the lower ends of manifolds 28 adjacent the intake valves, not shown, of the respective cylinders and supply fuel thereto when the intake valves are open. Fuel is supplied to each fuel nozzle 30 through a conduit 34 from a fuel manifold 36 which is in turn supplied by a conduit 38 from a fuel supplying and metering device indicated generally at 40. The fuel nozzles are more fully described in copending application Serial No. 608,893 Dolza, filed September 10, 1956.

The fuel supplying and metering device 40, as shown in Figure 5, is mounted in a housing which includes a case 42 and a cover 44. A conduit 46 is formed in cover 44 and is supplied with fuel from a low pressure make-up pump, not shown. A float controlled valve mechanism 50 is also disposed in cover 44 and communicates with conduit 46 through a passage 52 to which filtered fuel is supplied in accordance with the vertical position of the valve member 54 as determined by the position of a pivoted float actuated arm 56. In the normal manner, as float 58 is raised and lowered a valve 54 will shut off or admit fuel into a fuel reservoir 60 provided in casing 42.

A constant displacement type pump 70 which is driven at engine speed is mounted in the fuel reservoir and is adapted to pump fuel from the reservoir 60 to a conduit 72 leading generally to a metering chamber 74.

Chamber 74 is separated from the fuel reservoir by a partition 76. A bore 78 is formed in the casing of chamber 74 and is adapted to support therein a fuel metering valve 80, the details of which are described in the aforementioned copending application Serial No. 608,853 Dolza, filed September 10, 1956, now Patent No. 2,843,098. Suffice it to say that conduit 72 supplies fuel to a chamber 82 defined by valve 80 and a removable plug 84. The fuel passes from chamber 82 through a central conduit 86, formed in a slidable plug portion 88 of the valve 80, to a ball check valve 90 seated upon the upper end of the plug 88. Valve 90 blocks the flow of fuel through conduit 86 with a force determined by the rate of a spring 92 which presses upon the ball check valve 90. The valve 80 also includes a cylindrical sleeve 94 having a plurality of circumferentially disposed ports 96 therein which communicate the fuel flowing around ball check valve 90 to an annularly relieved portion 98 of sleeve 94. The annularly relieved portion 98 of sleeve 94 thereafter communicates with a passage 100 in the casing wall into which is treaded an adapter plug 102 connecting with the fuel manifold supplying conduit 38.

Sleeve 94 also has a set of peripherally disposed bypass or spill ports 104 above the ports 96. Ports 104 communicate the interior of sleeve 94 to the chamber 74 and thence through a passage 106 back to the fuel reservoir 60. To control the quantity of fuel bypassed through valve 80 back to reservoir 60 and hence the quantity of fuel supplied to the fuel nozzles, a cylinder 108 closed at the upper end is slidably mounted in sleeve 94. The open end of cylinder 108 terminates proximate spill ports 104 in sleeve 94. Fuel pressure within the valve body and which, as noted, is proportional to engine speed tends to move the cylinder 108 upwardly to open ports 104 and thereby bypass fuel to the reservoir.

A linkage mechanism indicated generally at 110 and controlled by a diaphragm 112 exerts a force on top of the valve, as generally described in the aforementioned copending application Serial No. 608,853, now Patent No. 2,843,098, which is proportional to the quantity of air flowing through the system. Thus it will be seen that the quantity of fuel supplied to the nozzles 30 by metering valve 80 is proportional to the differential effect of engine speed, as manifested by fuel pressure, and the quantity of air flowing through the system, as manifested by vacuum acting on diaphragm 112.

Other features of the subject type system such as the coasting shut-off mechanism 120 as well as the fuel enrichment devices 130 and 140 are described in detail in copending application 608,853, now Patent No. 2,843,098. Since these devices are not directly pertinent to the subject invention no further reference will be made thereto.

In Figure 2 an idle air bleed device 150 is provided in air horn casing 24 for bypassing air around a throttle 152 during the idle operation of the system. Device 150 includes a passage 154 terminating posteriorly of the throttle valve 152, a second passage 156 terminating anteriorly of the throttle and a passage 158 connecting posterior-anterior passages 154 and 156. An adjustable valve 160 is mounted in the air horn casing 24 and provides a means whereby the quantity of bypass air may be varied.

Disposed in parallel with the idle air bleed device 150 is passage means for sensing the quantity or mass of air flowing through idle air bleed. The quantity sensing means includes a passage 162 communicating with the induction passage bore immediately anterior of throttle 152. Passage 162 connects with a somewhat larger chamber 164 in turn connected through a restricted passage 166 to air bleed passage 154. Thus as idle air passes through passage 154 a vacuum is created in chamber 164 proportional to the quantity of said idle air. An adjustable needle valve 168 is mounted in the air horn casing and projects into passage 166 in order to vary the magnitude of the low air flow vacuum signal which is created during idling.

In order to convey the low air flow vacuum signal from the air horn 24, an axial passage 170 is formed therein and terminates in a perpendicularly disposed threaded boss 172. For ease of manufacture, passage 170 may be drilled or cored through the casing 24 and thereafter blocked off at the upper end by a plug 174.

Thus, with the throttle valve closed, as shown in Figure 2, air will be bypassed through passages 156, 158 and 154 creating a low air flow vacuum signal in chamber 164 and passage 170. This vacuum signal is conveyed to the diaphragm chamber 180 by a conduit 182 which connects with one nipple 184 of a T-plug 186 threadedly mounted in the vacuum chamber cover 188.

Upon the opening of throttle 152 the low air flow vacuum signal gradually reduces until it is essentially non-existent or at least has no further fuel control influence on the system. Therefore, additional means is provided whereby a high air flow vacuum signal will be transmitted to diaphragm chamber 180 to maintain the control of metering valve 80.

With respect to the high air flow sensing means, it is well to understand certain of the basic considerations which have led to the development of the Venturis 190 and 210 shown respectively in Figures 2 and 3.

As already noted, in the mass air flow type fuel induction system, it is necessary to provide means whereby the quantity of air flowing through the system is accurately measured in such a way as to provide a signal for the fuel controlling mechanism. A venturi is the traditional and most natural device for measuring such air flow. However, certain complications arise in using a venturi in the subject type system wherein the measure of air flow must be very accurate, a corollary of which is that the venturi must be very efficient.

A conventional venturi, of what has been termed the circular cross sectional area type, which would provide the minimum vacuum signal necessary to operate the subject fuel control mechanism for an illustrative type engine might have a diameter of approximately 1¾ inches at the throat thereof. It is necessary to provide the proper expansion angle to prevent turbulence and loss of energy and thus insure high flow efficiency through the venturi. Such an angle would be between six and seven degrees, permitting a gradual increase to three diameters or 5¼ inches resulting in a venturi length of 23 inches. While such a venturi would provide the type of operation requisite to the proper functioning of the subject system, the length would be beyond tolerable limits based on the amount of engine space available.

To solve this problem of reducing the venturi length to within commercially practical limits and at the same time preserving the necessary venturi efficiency, the present unique annular venturi designs were developed.

To compare the advantage of such an annular venturi with the normal type venturi illustrated, supra, it is to be noted that by constructing the venturi opening in an annular form in which case the area varies as a square of the diameter, the annular cross section can be relatively small. The throat dimension of an annular venturi equivalent to the 1¾ inches diameter previously mentioned would be .351 inch. Accordingly, to expand the air from the annular throat restriction to the same relative three diameters requires only 4.6 inches of venturi length. It is therefore appreciated that the venturi construction results in a very significant reduction in venturi length and which reduction is compatible with the ever decreasing amount of space available for engines particularly as applied to automotive type vehicles.

It is to be understood that the dimensions used, while generally correct, have been here used mainly for illustrative and comparative purposes and in no way intend to limit the scope of the present invention.

Having thus established the basic advantage of the present annular venturi type construction, the specific structural details of the venturis will now be considered.

Referring first to the species shown in Figures 1 and 2, it will be seen that the air horn 24 defines a cylindrical induction passage 192 into which a tapered plug 194 is adapted to project. The air horn has a flanged portion 196 formed at the open end thereof which is adapted to support the venturi plug 194 in a manner which will subsequently be described.

The plug 194 has a tapered cross section which, for the sake of economy of material as well as reducing the overall mass thereof, is preferably of a hollow construction with the outer or open end flared to provide a flange portion 198. The flange portion 198 of plug 194 is essentially diametrically coextensive in extent with the flange 196 formed on the air horn 24. The plug 194 is adapted to be supported on the air horn so as to project within the induction passage in radially spaced relation thereto and further so supported that the flared end 198 is axially spaced from the air horn flange 196. Thus positioning the plug 194 it cooperates with the induction passage to define an annular venturi having a throat 200.

The plug 194 may be supported upon the air horn 24 in any suitable manner commensurate with the recited radial and axial spaced relations. It has been found satisfactory to utilize members 202 for peripherally supporting the plug 194 upon the flange 196 of the air horn. The members 202 comprise spacing sleeves 204 formed integrally with or separate from either the plug or the air horn and screws 206 which thread within the sleeves 204 to suitably secure the plug upon the air horn as shown.

With the plug as thus constructed and disposed in relation to the air horn it will be seen that the venturi entrance 208 defined between the plug and air horn flanges 196 and 198 admits air in a direction normal to the flow of air through the induction passage. In other words, in this form there is provided a side opening venturi.

Where it is desired to provide a straight in-flow type venturi it is possible to construct the venturi as shown in Figures 3 and 4. This construction may be preferred where it is desired to mount an air cleaner directly on the air horn 24. The air horn of Figure 3 is the same as that of Figures 1 and 2 except as hereinafter specifically described, therefore, the idle air bleed structure, throttle, etc. have not been shown. In this case a plug supporting member 212 is provided with an axially extending sleeve 214 upon which an air cleaner may be mounted. The member 212 is also provided with a plurality of radially inwardly extending ribs 216 upon which a downwardly dished plug portion 218 is centrally supported. An elongated dished plug section 220 is adapted to be suitably joined with the section 218 in any convenient manner so as to form the hollow tapered plug 221. It has been found convenient to join the plug sections 218 and 220 by the use of a stud member 222 which passes through an opening 224 in elongated section 220 and it is threaded into an axially extending boss 226 formed interiorly of the plug section 218.

The multi-part construction of plug 221 has been resorted to for reasons of economy and ease of manufacture but it is within the scope of the invention that the hollow plug be formed of an integral or unitary type construction.

Thus, in the species shown in Figures 3 and 4, the venturi entrance 230 is normal to the induction passage axis and therefore permits air to flow in a straight line into the induction passage rather than at an angle as in the species of Figures 1 and 2. Further, in the second species the entire plug 221 is disposed within the induction passage in contradistinction to the first specie in which the flared end 198 of plug 194 is axially spaced from the open end of the induction passage of the air horn.

While the structural configurations of the plugs 194 and 210 are distinct, they are intended insofar as accurately sensing the mass of air flow through the system is concerned to function in the same manner. Further in common, although achieved by specifically different structures, the plugs 194 and 210 are supported as cantilevers upon the air horn 24. The advantage of which cantilever support is to reduce the structure necessary to mount the plugs, a corollary advantage of which is the reduction of flow impeding or restricting structure and which structure inherently reduces the efficiency of the venturi.

An annular chamber 236 is formed in the air horn 24 adjacent the respective venturi throats 200 and 238. The annular chamber 236 is communicated with the venturi throat through an annular slot 240. The chamber 236 may be formed in the air horn in any convenient manner. In the devices shown, the chamber is formed by axially relieving the end portion of the air horn and enclosing the latter by a cover member 242 or 244. Chamber 236 is connected by a conduit 246 to the remaining nipple 248 of T-plug 186.

During conditions of low air flow, as at idle as described above, the air flow through the annular venturi 200 or 238 is so low as to create virtually no vacuum in chamber 236. However, as air flow increases during the transition from idling to normal operation the quantity of air flow through the venturi progressively increases and with it the magnitude of the vacuum in annular chamber 236. Thus, the relationship between the vacuum signals in chambers 164 and 236 is generally such that as one increases the other decreases with the increasing vacuum force tending to provide operating signals for the fuel controlling device 40.

As described in detail in copending application Serial No. 608,797, Olson, filed September 10, 1956, the low air flow vacuum signal conduit 246 has an orifice 250 formed therein for the purpose of delaying the vacuum drop in said conduit to provide a smoother transition from idling to normal running operation.

The cross sectional configuration of plugs 194 and 210 is calculated to provide the most efficient, and therefore least turbulent, air flow through the venturi and it is to be understood that while the precise configurations might vary to some extent they will in all cases be of the general tapering configurations shown. It will be further noted that the inner or most tapered ends 195 and 211 of the plugs have been blunted or cut-off in an effort to economize slightly on the over-all venturi length. The induction passage may thus be foreshortened by permitting the throttle valve to be moved closer to the plug. While the blunting of the plugs 194 and 210 may tend to slightly reduce the flow efficiency the magnitude of the loss is so slight as to be of no consequence in the actuation of the fuel flowing device 40.

It will also be noted that the blunted ends of the venturi plugs 194 and 210 terminate intermediate the vacuum chambers 164 and 236 in as physically close proximity with the throttle valve 152 as is feasible.

I claim:

1. A fuel induction system of the mass air flow type for an internal combustion engine comprising an air horn having an induction passage therein, a throttle valve for controlling the air flowing through said passage, a nozzle posteriorly of the throttle valve for supplying fuel to the induction passage, a valve for supplying fuel to the nozzle, a device for controlling said valve, means for supplying fuel to said valve, a venturi means in the induction passage anteriorly of the throttle valve, said venturi means including a tapered plug supported upon the air horn and projecting within the induction passage in radially spaced relation thereto, said plug and induction passage coacting to define an annular venturi passage, one end of said plug axially spaced from the air horn and substantially diametrically coextensive therewith, the axially spaced end of said plug and the adjacent portion of said air horn defining an annular inlet opening concentrically disposed to the induction passage axis, an annular chamber formed in said air horn and communicating with the venturi throat, and means connecting the annular chamber and the valve controlling device whereby said device is actuated by vacuum which is in said chamber.

2. A fuel induction system of the mass air flow type for an internal combustion engine comprising an air horn having an induction passage therein, a throttle valve for controlling the air flowing through said passage, a nozzle posteriorly of the throttle valve for supplying fuel to the induction passage, a valve for supplying fuel to the nozzle, a device for controlling said valve, means for supplying fuel to said valve, a venturi means in the induction passage anteriorly of the throttle valve, said venturi means including a tapered plug supported upon the air horn and projecting within the induction passage in radially spaced relation thereto, said plug and induction passage coacting to define an annular venturi passage, an annular flange portion formed on the inlet end of said air horn, one end of said plug terminating in a flange portion substantially diametrically coextensive with the air horn flange, means cooperating with said flanged portions to maintain them in axially spaced concentric relation whereby said plug and air horn define an annular inlet opening, an annular chamber formed in said air horn and communicating with the venturi throat, and means connecting the annular chamber and the valve controlling device whereby said device is actuated by vacuum which is in said chamber.

References Cited in the file of this patent

UNITED STATES PATENTS

| | | |
|---|---|---|
| 1,126,275 | Rice | Jan. 26, 1915 |
| 2,240,119 | Montgomery et al. | Apr. 29, 1941 |
| 2,372,332 | Mock | Mar. 27, 1945 |
| 2,390,658 | Mock | Dec. 11, 1945 |
| 2,439,723 | Engdahl | Apr. 13, 1948 |
| 2,457,765 | Winkler | Dec. 28, 1948 |
| 2,577,435 | Siebenthaler | Dec. 4, 1951 |

FOREIGN PATENTS

| | | |
|---|---|---|
| 103,695 | Germany | July 10, 1926 |